(12) United States Patent
Burch et al.

(10) Patent No.: US 9,380,062 B2
(45) Date of Patent: *Jun. 28, 2016

(54) TECHNIQUES FOR SHARING VIRTUAL MACHINE (VM) RESOURCES

(71) Applicant: Novell, Inc., Provo, UT (US)

(72) Inventors: Lloyd Leon Burch, Payson, UT (US); Prakash Umasankar Mukkara, Bangalore (IN); Douglas Garry Earl, Orem, UT (US)

(73) Assignee: Novell, Inc., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/468,927

(22) Filed: Aug. 26, 2014

(65) Prior Publication Data

US 2014/0366096 A1    Dec. 11, 2014

Related U.S. Application Data

(62) Division of application No. 12/728,115, filed on Mar. 19, 2010, now Pat. No. 8,831,993.

(51) Int. Cl.
| | |
|---|---|
| *G06F 21/00* | (2013.01) |
| *H04L 29/06* | (2006.01) |
| *G06F 9/455* | (2006.01) |
| *G06F 21/53* | (2013.01) |
| *G06F 9/46* | (2006.01) |
| *H04L 29/08* | (2006.01) |

(Continued)

(52) U.S. Cl.
CPC ............ *H04L 63/10* (2013.01); *G06F 9/45533* (2013.01); *G06F 9/468* (2013.01); *G06F 21/53* (2013.01); *H04L 9/3247* (2013.01); *H04L 29/08468* (2013.01); *H04L 63/08* (2013.01); *H04L 63/20* (2013.01); *G06F 9/5077* (2013.01); *G06F 2212/151* (2013.01); *H04L 29/06612* (2013.01); *H04L 29/08846* (2013.01)

(58) Field of Classification Search
CPC ..... G06F 9/45533; G06F 9/468; G06F 21/53; H04L 29/08468; H04L 63/08; H04L 63/20
See application file for complete search history.

(56) References Cited

U.S. PATENT DOCUMENTS

| 6,058,395 A | 5/2000 | Buzaglo et al. |
| 6,748,470 B2 | 6/2004 | Goldick |
| 6,895,501 B1 | 5/2005 | Salowey |

(Continued)

OTHER PUBLICATIONS

"Initializing and Managing a Virtual Machine", Sandia National Laboratories, all pages, [Online]. Retrieved from the internet: <http://www.cs.sandia.gov/cplant/doc/runtimeAdmin1_0/node4.html>, (Jun. 25, 2001).

(Continued)

*Primary Examiner* — Calvin Cheung
(74) *Attorney, Agent, or Firm* — Schwegman Lundberg & Woessner, P.A.

(57) ABSTRACT

Techniques for sharing virtual machine (VM) resources are provided. A relative location for a resource within a VM is created; the relative location dynamically resolves to a particular physical location when a principal requests access to the resource at runtime. The principal is located outside an environment associated with the VM. Authentication and access restrictions are dynamically enforced against the requests made by the principal before a connection is permitted between the principal and the resource (the resource located within the environment of the VM).

15 Claims, 6 Drawing Sheets

(51) Int. Cl.
*H04L 9/32* (2006.01)
*G06F 9/50* (2006.01)

(56) References Cited

U.S. PATENT DOCUMENTS

| | | |
|---|---|---|
| 7,313,605 B2 | 12/2007 | Iloglu et al. |
| 7,356,818 B2 | 4/2008 | Carollo et al. |
| 7,389,399 B2 | 6/2008 | Terrell et al. |
| 7,421,533 B2 | 9/2008 | Zimmer et al. |
| 7,609,167 B1 | 10/2009 | Light et al. |
| 7,617,498 B1 | 11/2009 | Lumsden |
| 7,660,917 B2 | 2/2010 | Freking et al. |
| 7,730,030 B1 | 6/2010 | Xu |
| 7,865,724 B2 | 1/2011 | Alvarado et al. |
| 7,904,608 B2 * | 3/2011 | Price ........................ G06F 8/65 710/10 |
| 7,975,270 B2 | 7/2011 | Ferri et al. |
| 8,024,407 B2 | 9/2011 | Harwood et al. |
| 8,102,781 B2 * | 1/2012 | Smith ................... G06F 9/4856 370/252 |
| 8,335,902 B1 | 12/2012 | Feathergill |
| 8,533,724 B1 | 9/2013 | Theimer et al. |
| 8,656,018 B1 | 2/2014 | Keagy et al. |
| 8,831,993 B2 | 9/2014 | Burch et al. |
| 2002/0032634 A1 | 3/2002 | Abrams et al. |
| 2002/0143897 A1 | 10/2002 | Patil |
| 2004/0039926 A1 | 2/2004 | Lambert |
| 2004/0097267 A1 | 5/2004 | Pecen et al. |
| 2006/0212937 A1 | 9/2006 | Natarajan |
| 2007/0006230 A1 * | 1/2007 | Neiger ................ G06F 9/45533 718/100 |
| 2007/0028238 A1 * | 2/2007 | Bennett .............. G06F 9/45558 718/1 |
| 2007/0106769 A1 | 5/2007 | Liu |
| 2007/0136579 A1 | 6/2007 | Levy et al. |
| 2007/0245348 A1 * | 10/2007 | Araujo .................... G06F 21/53 718/1 |
| 2007/0283359 A1 | 12/2007 | Demsey et al. |
| 2007/0294676 A1 | 12/2007 | Mellor et al. |
| 2008/0070557 A1 | 3/2008 | Paila et al. |
| 2008/0077765 A1 * | 3/2008 | Illikkal ............... G06F 12/0284 711/202 |
| 2008/0104079 A1 | 5/2008 | Craig |
| 2008/0114860 A1 | 5/2008 | Keys et al. |
| 2008/0134177 A1 * | 6/2008 | Fitzgerald ............... G06F 21/51 718/1 |
| 2008/0163254 A1 * | 7/2008 | Cota-Robles ....... G06F 9/45558 719/318 |
| 2008/0168184 A1 * | 7/2008 | Freedman ........... H04L 67/1095 709/248 |
| 2008/0222638 A1 * | 9/2008 | Beaty .................. G06F 9/45558 718/100 |
| 2008/0244576 A1 | 10/2008 | Kwon et al. |
| 2008/0244579 A1 * | 10/2008 | Muller .................. G06F 9/5027 718/100 |
| 2008/0244595 A1 | 10/2008 | Eilam et al. |
| 2009/0019509 A1 | 1/2009 | Horn et al. |
| 2009/0089527 A1 * | 4/2009 | Schoenberg ........ G06F 9/45558 711/163 |
| 2009/0106347 A1 | 4/2009 | Harwood et al. |
| 2009/0216828 A1 * | 8/2009 | Gebhart ................ G06F 9/5077 709/201 |
| 2009/0276784 A1 | 11/2009 | Grieve et al. |
| 2009/0282472 A1 | 11/2009 | Hamilton, II et al. |
| 2009/0327471 A1 * | 12/2009 | Astete ................ G06F 9/45533 709/223 |
| 2010/0027552 A1 * | 2/2010 | Hill ........................ H04L 12/66 370/401 |
| 2010/0037307 A1 | 2/2010 | Sandland et al. |
| 2010/0058334 A1 | 3/2010 | Mohindra et al. |
| 2010/0083148 A1 | 4/2010 | Finn et al. |
| 2010/0125798 A1 | 5/2010 | Brookhart |
| 2010/0169884 A1 * | 7/2010 | Bogin ................ G06F 9/45533 718/1 |
| 2010/0241763 A1 * | 9/2010 | Chan ................... H04L 67/2857 709/248 |
| 2010/0325284 A1 * | 12/2010 | Heim ..................... H04L 67/14 709/227 |
| 2011/0010325 A1 | 1/2011 | Brillhart et al. |
| 2011/0128281 A1 | 6/2011 | Bhogal et al. |
| 2011/0131509 A1 | 6/2011 | Brillhart et al. |
| 2011/0231840 A1 | 9/2011 | Burch et al. |
| 2011/0314462 A1 * | 12/2011 | Clark ....................... G06F 8/65 717/169 |

OTHER PUBLICATIONS

"Microsoft Computer Dictionary", 5th Edition, Microsoft Press, Redmond, WA, (2002), p. 484.

"The Elements of Style", 3rd Edition, Macmillan Publishing Co., Inc., New York, N.Y, (1979), p. 40.

* cited by examiner

TECHNIQUES FOR SHARING VIRTUAL MACHINE (VM) RESOURCES

This application is a divisional of U.S. patent application Ser. No. 12/728,115, filed on Mar. 19, 2010, now issued as U.S. Pat. No. 8,831,993, which is incorporated herein by reference in its entirety.

BACKGROUND

Increasingly, services and communication are achieved over the Internet and the World-Wide Web (WWW). Geographical location is becoming irrelevant with respect to network connectivity. Furthermore, the physical devices used by individuals to communicate and conduct business are increasingly becoming transparent through machine virtualization techniques and miniaturization.

In a Virtual Desktop Infrastructure (VDI) system, virtual machines are spawned or instantiated on demand. The identity of a virtual machine is established when it is instantiated. In a typical VDI system, after the Virtual Machine (VM) is instantiated, a user gets access to the console through either a Remote Desktop Protocol (RDP) or a Virtual Network Computing (VNC) protocol over a secure tunnel. The VM identity (typically the Internet Protocol (IP) address and communication port number combination) keeps changing when the VM goes up and down, so do the identities of the resources on the virtual machines. It is a challenge to transfer the resource (for example a file) on these VMs to other machines in a virtual cloud in a secure manner while adhering to policies. It is also challenging to retrieve a resource that is present on the VM from an external system.

Another challenging scenario is that in a VDI system, it is too big a task for an administrator to manage the access policies for the resources on the VMs. It becomes a common requirement that the owner of the VM needs to decide which resources should be shared and which ones should not be. Think of a Windows® user sharing a file on his/her system and setting read/write permission for a particular user or group of users. In a VDI system, it is a challenge to do the same task if the user who is accessing a shared/permitted resource is from an external system (external to the VM).

SUMMARY

In various embodiments, techniques for sharing virtual machine (VM) resources are presented. More specifically, and in an embodiment, a method for sharing a VM resource is taught. A request for creating an artifact for a resource is received; the request is received from a requestor of a VM and the resource is available form that VM. The artifact is created as a logical reference to the resource and the logical reference is dynamically resolved to a particular location for the resource within an executing instance of the VM when the artifact is subsequently provided by a requesting principal, who is external to the VM. Finally, the artifact is supplied to the requestor within the VM; the requestor subsequently shares the artifact with the requesting principal for the requesting principal to use to gain access to the resource being shared from the VM.

DETAILED DESCRIPTION

Figure 1:
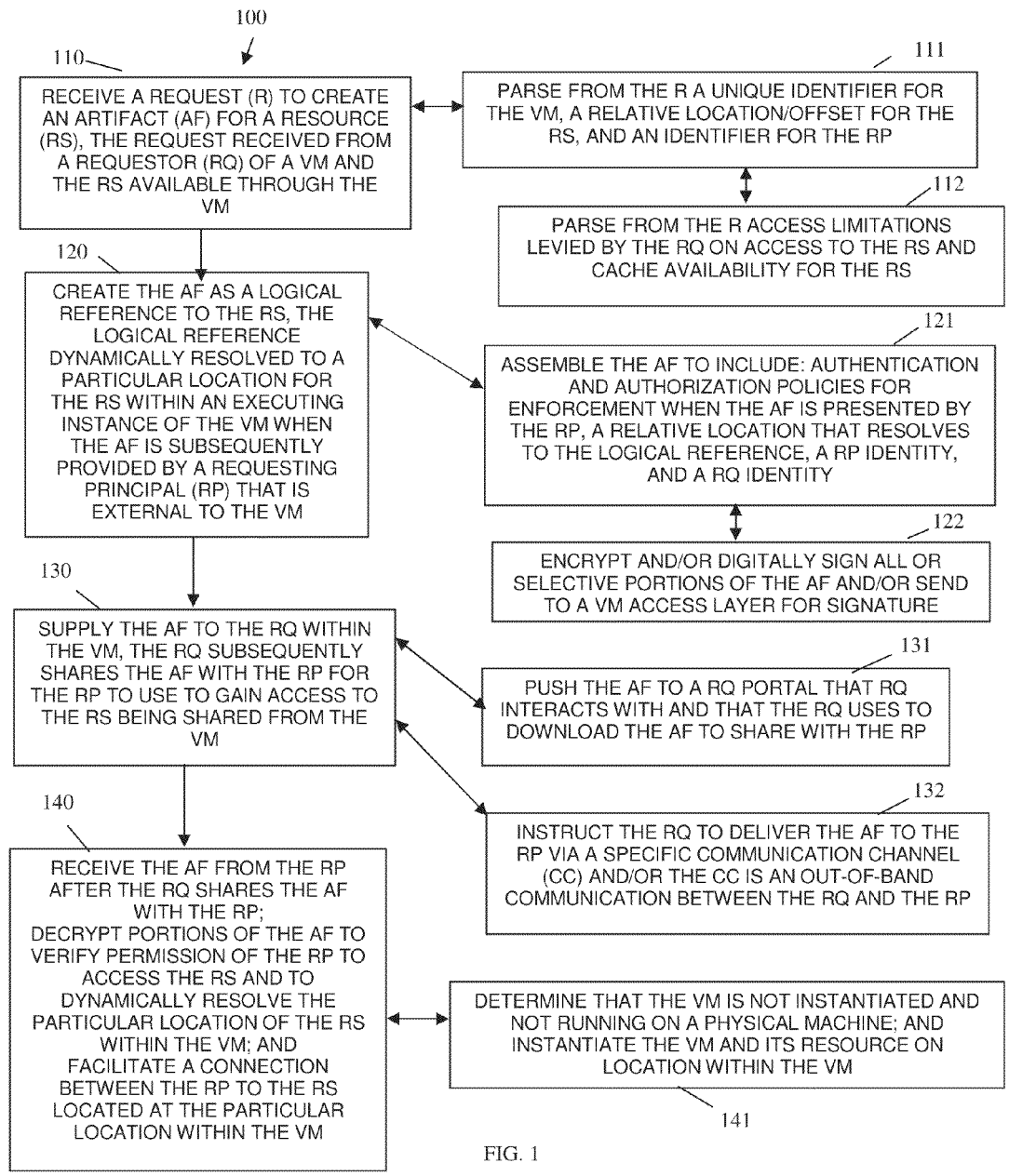
FIG. 1 is a diagram of a method for externally sharing a VM resource, according to an example embodiment.

A "resource" includes a user, service, system, device, directory, data store, groups of users, files, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is electronically assigned to an entity for purposes of uniquely (although not always and dependent on the context) identifying that entity. An identity is formulated from one or more identifiers, which can be public, secret, and/or trusted. The identifiers are used to verify or rely on an assigned identity. Identifiers can be verified and/or relied upon based on verifying one or more secrets and/or trust relationships. Once verified, an identity can be used for providing statements of roles and/or permissions that the identity has in relation to resources. So, an "identifier" is information, which may be private and/or trusted and which permits an identity to be formed, and some portions of an identifier may be public information, such as a user identifier, name, etc. Some examples of identifiers include social security number (SSN), assertions, tokens, user identifier and password pair, account number, retina scan, fingerprint, face scan, etc.

A "virtual machine" (VM) may be viewed as a logical processing environment overlaid or superimposed on a physical device. The VM is a logical machine that is independent of its physical process environment or physical machine. It may include its own operating system (OS), its own file system (FS), its own directory services, etc., which may each be different from the physical processing environment.

Various embodiments of this invention can be implemented in existing network architectures. For example, in some embodiments, the techniques presented herein are implemented in whole or in part in the Novell® operating system products, directory-based products and other products distributed by Novell®, Inc., of Waltham, Mass.

Also, the techniques presented herein are implemented in machines, such as processor or processor-enabled devices. These machines are configured to specifically perform the processing of the methods and systems presented herein. Moreover, the methods and systems are implemented and reside within non-transitory computer-readable storage media and processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of FIGS. 1-6.

FIG. 1 is a diagram of a method 100 for externally sharing a VM resource, according to an example embodiment. The method 100 (hereinafter "identity sharing facilitation service") is implemented in a non-transitory machine-accessible and computer-readable medium as instructions that execute on one or more processors (machines, computers, processors, etc.). The machine is specifically configured to process the identity sharing facilitation service. Furthermore, the identity sharing facilitation service is operational over and processes within a network. The network may be wired, wireless, or a combination of wired and wireless.

According to an embodiment, the identity sharing facilitation service is provided from the perspective of a third-party authentication facilitation service that is implemented external to any particular instance of a VM but is accessible over a network connection to each instance of the VM's.

At 110, the identity sharing facilitation service receives a request to create an artifact for a resource. The request is received from a requestor (user or automated service) of a VM and the resource is only available within the context or environment of the VM. The artifact is a set of information this is used to identify the resource, verify access to the resource, and identify security and/or policies to enforce when access to the resource is requested. Some example information of the contents of an artifact is provided below with reference to the FIG. 5.

According to an embodiment, at 111, the identity sharing facilitation service parses the request to acquire a unique identifier for the VM and a relative path or offset for a relative location to the resource within the context of the VM. The request is also parsed for an identifier or identity of a requesting principal (subsequent resource (user or automated service) that attempts to access the resource outside the context or environment of the VM). It may also be that the requestor provides, within the request, a role(s) that the requesting principal is associated with or even a list of available requesting principals that can access the resource.

Continuing with the embodiment of 111 and at 112, the identity sharing facilitation service also parses from the request access limitations that are to be levied by the requestor on access to the resource. The requestor can also identify whether the resource is available for caching or can be managed and acquired via a cache.

It is noted that within the context of the discussion for the FIG. 1, the requestor is the entity that desires to share the resource from within the context or environment of the VM. The requesting principal is a resource that exists outside the context or environment of the VM and subsequently attempts to access the resource within the VM.

At 120, the identity sharing facilitation service creates the artifact as a logical reference to the resource. The logical reference is dynamically resolved at runtime to a particular physical location on the network for acquiring access to the resource within the VM. So, the particular location is within executing instances of the VM. It is noted that this particular location can change as the VM is terminated and re-instantiated. So, the particular location can change. The logical reference is one that at runtime resolves to the then-existing particular location for the resource.

In an embodiment, at 121, the identity sharing facilitation service assembles the artifact to include a variety of information, such as but not limited to: authentication and authorization policies for enforcement when the artifact is presented by the requesting principal; a relative location that resolves to the logical reference; a requesting principal identity for the requesting principal (the entity attempting to subsequent acquire access to the resource outside the context or environment of the VM); and a requestor identity (the sharing entity's identity).

Continuing with the embodiment of 121 and at 122, the identity sharing facilitation service also encrypts and/or digitally signs all or selective portions of the artifact. So, just the identity sharing facilitation service is capable of decrypting and verifying some parts of the artifact, such as the logical reference.

Still continuing with the embodiment of 122, the identity sharing facilitation service can also send the encrypted and/or signed artifact to a VM access layer and the VM access layer can assist in providing the logical reference and digitally signs some portions of the artifact. The VM access layer then returns its signed portion of the artifact back to the identity sharing facilitation service.

At 130, the identity sharing facilitation service supplies the artifact to the requestor within the VM. The requestor then subsequently shares the artifact with the requesting principal for the requesting principal to later use for purposes of gaining access to the resource, which is being shared from within the context or environment of an executing instance of the VM.

According to an embodiment, at 131, the identity sharing facilitation service pushes the artifact to a requestor portal that the requestor interacts with and the requestor uses to download the artifact for sharing with the requesting principal.

In another situation, at 132, the identity sharing facilitation service instructs the requestor to deliver the artifact to the requesting principal via a specific communication channel.

Continuing with one aspect or situation of the embodiment at 132, the specific communication channel is an out-of-band communication that the requestor uses to communicate the artifact to the requesting principal. The out-of-band communication can include an email communication, a web site communication where the requesting principal can download the artifact, a text message having the artifact or details on how the requesting principal can acquire the artifact, and/or an instant message having the artifact or details on how the requesting principal can acquire the artifact.

In one case, at 140, the identity sharing facilitation service subsequently receives the artifact back from the requesting principal after the requestor shares the artifact with the requesting principal. The identity sharing facilitation service then decrypts portions of the artifact to verify permissions of the requesting principal for access to the resource and to dynamically and in real time resolve the particular location of the resource within a then-existing executing instance of the VM. Next, the identity sharing facilitation service facilitates a connection between the requesting principal to the resource located at the particular location within the VM.

Continuing with the embodiment of 140 and at 141, the identity sharing facilitation service determines that the VM is not loaded and processing when the requesting principal delivers the artifact to gain access to the resource. In response to this situation, the identity sharing facilitation service instantiates or causes to be instantiated the VM and its corresponding resource (that is being shared) on a machine and then the particular location is resolved for the requesting principal to gain access to the resource. The processing at 140 and 141 assume that the requesting principal is properly authenticated and verified for access via the artifact; if such authentication fails then access to the resource is denied.

Figure 2:
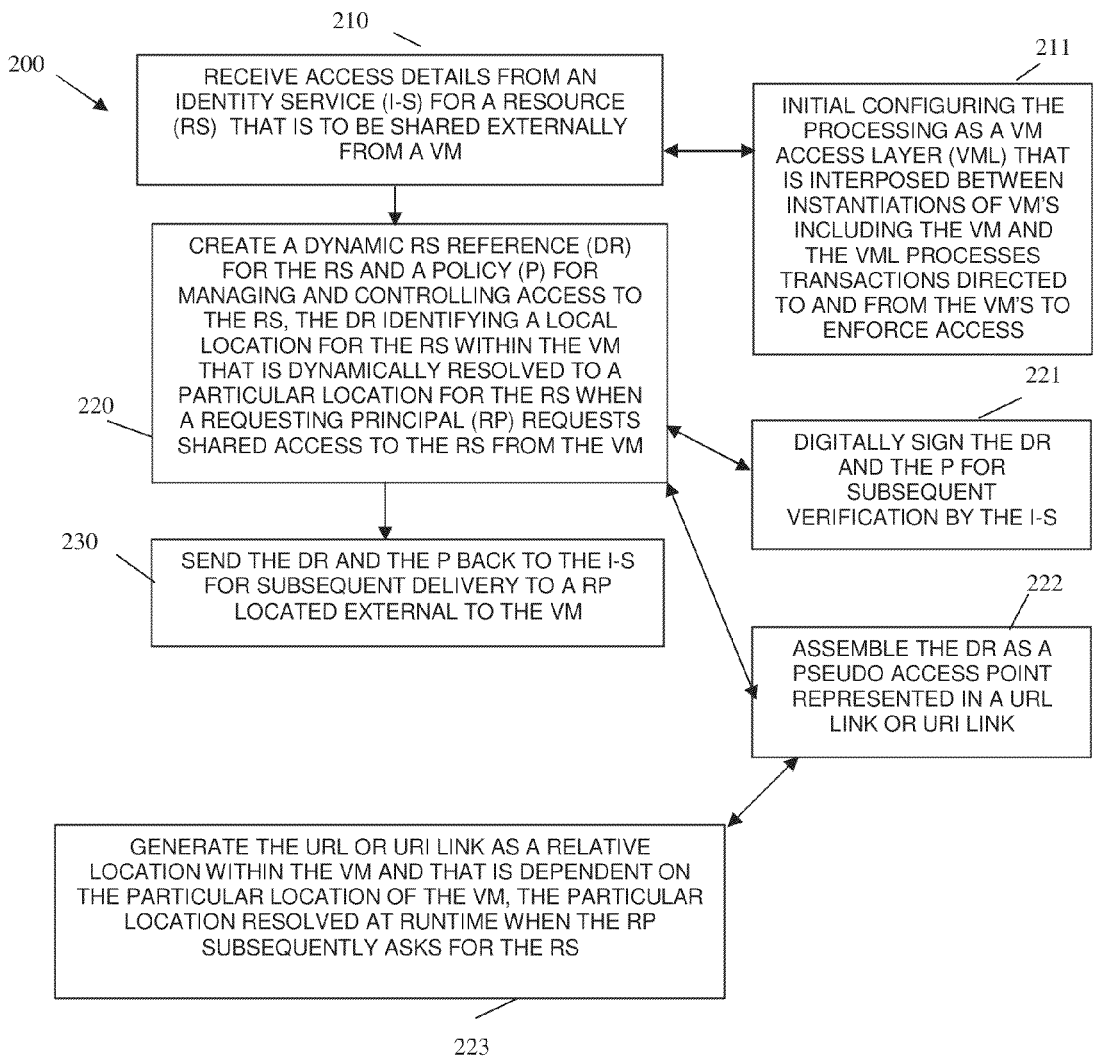
FIG. 2 is a diagram of another method for externally sharing a VM resource, according to an example embodiment.

FIG. 2 is a diagram of another method 200 for externally sharing a VM resource, according to an example embodiment. The method 200 (hereinafter "VM access layer service") is implemented in a non-transitory machine-accessible and computer-readable storage medium as instructions that execute on one or more processors of a network. The network may be wired, wireless, or a combination of wired and wireless. Furthermore, the processor (device having a processing instance of the VM access layer service) is specifically configured to process the VM access layer service.

The VM access layer service represents another aspect for externally sharing a VM resource. That is, the VM access layer service is another entity that interacts with the identity sharing facilitation service, represented by the method 100 of the FIG. 1. Some sample entities and components and their interactions with one another are shown below with reference to the FIG. 4.

At 210, the VM access layer service receives access details from an identity service for a resource that is to be shared externally from a context or environment of a VM. Here, the identity service may be viewed as the identity sharing facilitation service represented by the method 100 and discussed above with reference to the FIG. 1.

In an embodiment, at 211, the VM access layer service is initially configured when it is started as a VM access layer that is interposed between instantiations of VMs, including the VM having the resource, and the VM access layer processes and handles all transactions directed to and from the VMs for purposes of enforcing access restrictions to the VMs and their resources. This aspect of the VM access layer service is discussed in greater detail below with reference to the FIG. 4.

At 220, the VM access layer service creates a dynamic resource reference for the resource and a policy for managing and controlling access to the resource. The dynamic resource reference identifies a local location for the resource within the VM and the dynamic resource reference is dynamically and in real time resolved to a particular physical location for the resource when a requesting principal (entity trying to later access the resource outside the context and environment of the VM) requests shared access to the resource. So, the method 100 of the FIG. 1 discussed two scenarios one where the identity sharing and facilitation service created the local reference (dynamic resource reference) and one where the identity sharing and facilitation service asked a VM access layer to create the local reference. The VM access layer service implements the latter situation.

In a particular situation, at 221, the VM access layer service digitally signs the dynamic resource reference and the policy for subsequent verification by an identity service, such as the identity sharing and facilitation service represented by the method 100 of the FIG. 1.

In an embodiment, at 222, the VM access layer service assembles the dynamic resource reference as a pseudo access point that is represented in a Uniform Resource Locator (URL) link or a Uniform Resource Identifier (URI) link.

Continuing with the embodiment of 222 and at 223, the VM access layer service generates the URL or URI link as a relative location within the VM and that is dependent on the particular location of the VM when a requesting principal attempts to access the resource, which is being shared. Again, it is noted that the particular location is resolved at runtime when the requesting principal subsequently asks for the resource.

At 130, the VM access layer service sends the dynamic resource reference and the policy back to the identity service for subsequent delivery to a requesting principal, who is located external to the context or environment of the VM.

Figure 3:
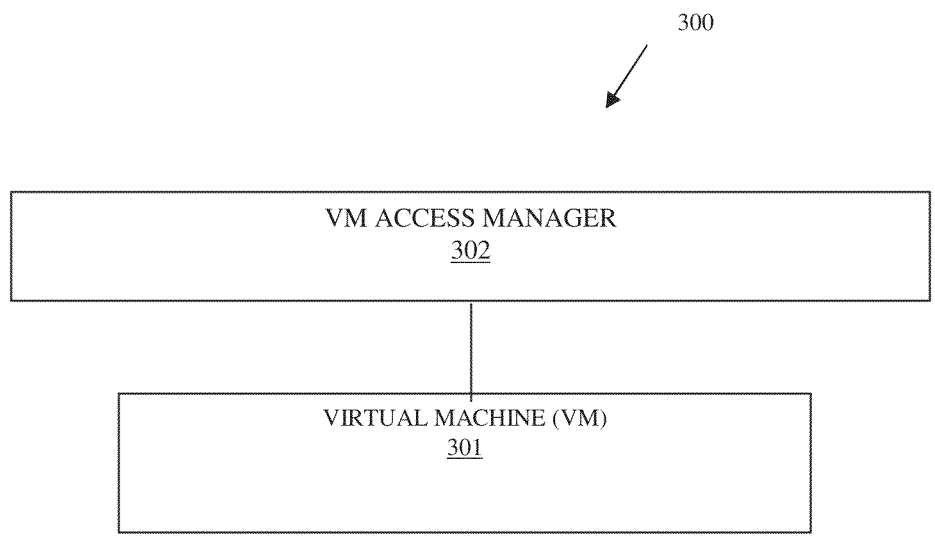
FIG. 3 is a diagram of a VM resource sharing system, according to an example embodiment.

FIG. 3 is a diagram of a VM resource sharing system 300, according to an example embodiment. The VM resource sharing system 300 is implemented in a machine-accessible and computer-readable storage medium as instructions that execute on one or more processors (multiprocessor) and that is operational over a network. The one or more processors are specifically configured to process the components of the VM resource sharing system 300. Moreover, the network may be wired, wireless, or a combination of wired and wireless. In an embodiment, the VM resource sharing system 300 implements, inter alia, certain aspects of the methods 100 and 200 represented by the FIGS. 1 and 2, respectively.

The VM resource sharing system 300 includes a VM 301 and a VM access manager 302. Each of these and their interactions with one another will now be discussed in turn.

The VM 301 includes a resource that is to be externally shared from the VM 301. The VM 301 is implemented in a non-transitory computer-readable storage medium and is to execute on a processor (physical machine). Example aspects associated with the VM 301 was provided in detail above with respect to the methods 100 and 200 of the FIGS. 1 and 2, respectively.

The VM 301 is configured to share the resource with external resources that process outside an environment or a context of the VM 301. The VM 301 interacts directly or indirectly with an identity service, such as the method 100 of the FIG. 1 and/or the VM access manager 302. The VM 301 can indirectly interact with the VM access manager 302 via the identity service.

According to an embodiment, the VM 301 is also configured to communicate the relative location via out-of-band communications with the external resources, such as emails, web site locations, text message, and/or instant messages.

The VM access manager 302 is implemented in a non-transitory computer-readable storage medium and executes on a different processor (different physical machine from that which is associated with the VM 301). Example processing details associated with the VM access manager 302 were presented in detail above with respect to the method 200 of the FIG. 2.

The VM access manager 302 is configured to provide a relative location for the resource within the VM 301 to the VM 301 (directly or indirectly) for the VM 301 to share with the external resources. Again, the relative location is configured to be dynamically resolved at runtime when the external resources present the relative location.

Furthermore, the VM access manager 302 is configured to also enforce access restrictions against transactions made by the external resources for the resource within the VM 301.

According to an embodiment, the VM access manager 302 is configured to dynamically initiate or start the VM 301 on the physical machine or a different physical machine when the external resources request the resource, via the relative location. The VM access manager 302 determines that the VM 301 is not instantiated and not running when the request is made for the resource and thusly starts the VM so access to the resource can be obtained.

In another situation, the VM access manager 302 is configured to facilitate authentication of each request made by the external resources for the resource before establishing a connection between the external resources and the resource of the VM 301.

Figure 4:
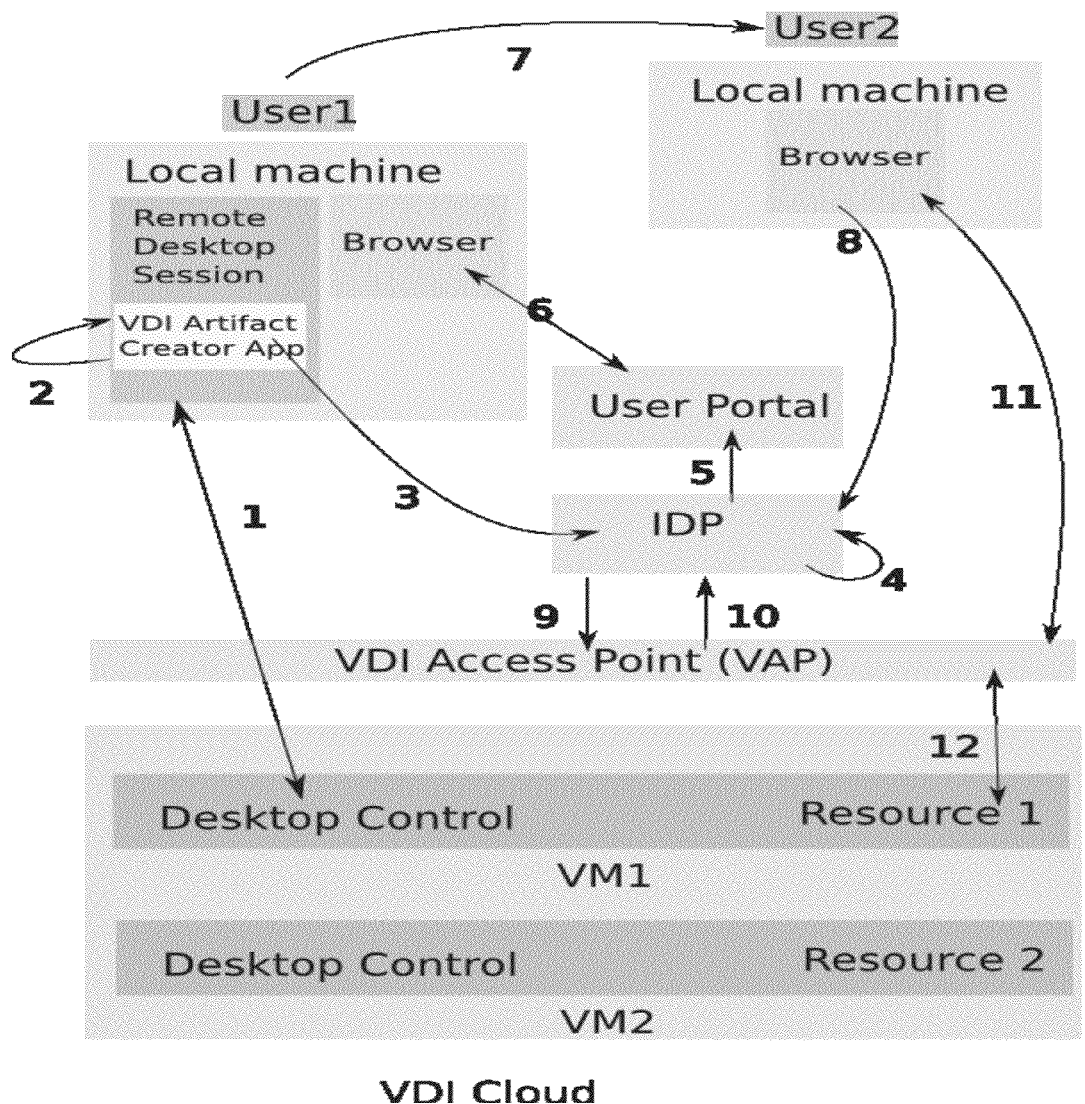
FIG. 4 is a diagram of example components of a VM resource sharing system, according to an embodiment.

FIG. 4 is a diagram of example components of a VM resource sharing system, according to an embodiment.

The techniques presented herein describe an identity structure (referred to as an artifact or VDI artifact) to a VDI resource so that the resource can be located independent of the VM that is hosting the resource.

The techniques presented herein also describe a mechanism by which authentication and authorization policies can be applied while accessing the VDI resource.

The techniques presented herein also describe a system for generating the VDI artifact for a particular resource, verifying the VDI artifact, and enforcing the policy while accessing the associated resource.

Referring now to the FIG. 1 and the numbered references that depict processing of the techniques presented herein.

At 1, a User1 (requestor) establishes a remote connection to a VDI cloud and accesses his/her VM using RDP. This process includes the following steps (which are not shown in the FIG. 4).

User accesses his/her portal. If not authenticated, redirection happens to an Identity Provider (IDP also referred to as an identity service and described with the FIG. 1 and method 100 above). The IDP authenticates the user.

After authentication, the IDP redirects the user back to his/her portal. The User chooses to establish a connection to VM1. The User is redirected back to VDI Access Point (VAP discussed with reference to the FIG. 2 and the method 200 above). The VAP enforces the access control policies.

An RDP connection is established between user1's machine and the VM1. User1 wishes to share or publish a resource on the VM to the external system (to the other machines in VDI cloud or to the machines outside the VDI cloud). A VDI Artifact creator application is launched on the VM. This application collects the details about the resource that is going to be shared.

At 2, the User1 chooses to share a resource and the VDI creator is launched.

At 3, the artifact creation request is made to the IDP. Resource details are provided in the request.

At 4, the artifact is created by the IDP (the details of the VDI artifact creation are given below with reference to the FIGS. 5 and 6).

At 5, the created VDI artifact is pushed to the user1's accessible area in the user portal.

At 6, the User1 accesses the portal from his/her physical machine (in this case from a browser) and downloads the artifact to the local machine for publishing or for distribution to the external system.

At 7, the User1 shares the artifact with User2 via an out-of-band communication, such as through e-mail.

At 8, the User2 (requesting principal) clicks on the artifact (which is a URL) and which will take the user to the IDP. The IDP dereferences (or decodes) the artifact and associates the resource to a particular VM. (Note that if the VM does not exist, a request is sent to VDI cloud for spawning an instance of the VM—this is not shown in the FIG. 4.)

At 9, if the artifact requires authentication, the User2 is forced to authenticate at the IDP. After successful authentication and artifact verification (the details of VDI Artifact verification described above and below herein), the IDP sends the details of the resource to VAP via the back channel. The details include the authorization policy.

At 10, after receiving the details of the resource, the VAP creates a pseudo access point or a dynamic resource (for example, https://vap.mycompany.com/dynamic-resources?id=ASLDw93929lj98s38n) and generates a policy for this resource. The policy encompasses the authentication and authorization requirements sent by IDP. The location of the dynamic resource is sent back to IDP.

At 11, the IDP redirects the User2 to the dynamically created resource on the VAP.

At 12, the VAP enforces the authorization policies and lets the User2 access the resource.

Figure 5:
FIG. 5 is a diagram of example content included within a VM artifact used by a VM resource sharing system, according to an embodiment.

FIG. 5 is a diagram of example content included within a VM artifact used by a VM resource sharing system, according to an embodiment.

VDI Artifact Structure:
http//idp.mycompany.com/vdi-artifact?<VDI Artifact XML payload>

The VDI artifact is, in an embodiment, an Extensible Markup Language (XML) payload created at the IDP and has the following contents:

Artifact Data:
    <Artifact Type>—This artifact can be a bearer-token type or holder-of-the-key-token type. If the artifact is not bearer-token type, then the Resource Data is encrypted by the public key of the IDP. The IDP can decrypt the Resource Data later on.

Owner Data:
    <Owner Identifier>—signed by private key of the Owner IDP can verify the ownership of the artifact using the public key of the Owner.

Alternatively, Owner identifier payload contains the owner data signed by private key of the IDP. This mechanism does eliminate the need for IDP to go to the user VM to get the owner payload signed.

Receiver Data:
    <Receiver Identifier>—If the artifact is not bearer-token type, <Receiver Identifier> will hold the receiver information, which is encrypted by the public key of the IDP.
    <Authentication Type>—The authentication type for the receiver authentication.
    <Authentication Timeout>—The period for which the receiver will remain authenticated.

Resource Data:
    <VM Identifier>—Unique identifier for the machine in the VDI cloud. This unique identifier will be dereferenced to an IP address at run time (or access time).
    <Resource relative location>—http://<VM>/path (or) ftp://<VM/path (or) scp VM:/path (or) SMB VM:/path, etc.
    <Access permitted Time>—The time of the day at which the resource can be accessed.
    <Cache Flags>—If VAP can cache the data or not.

Figure 6:
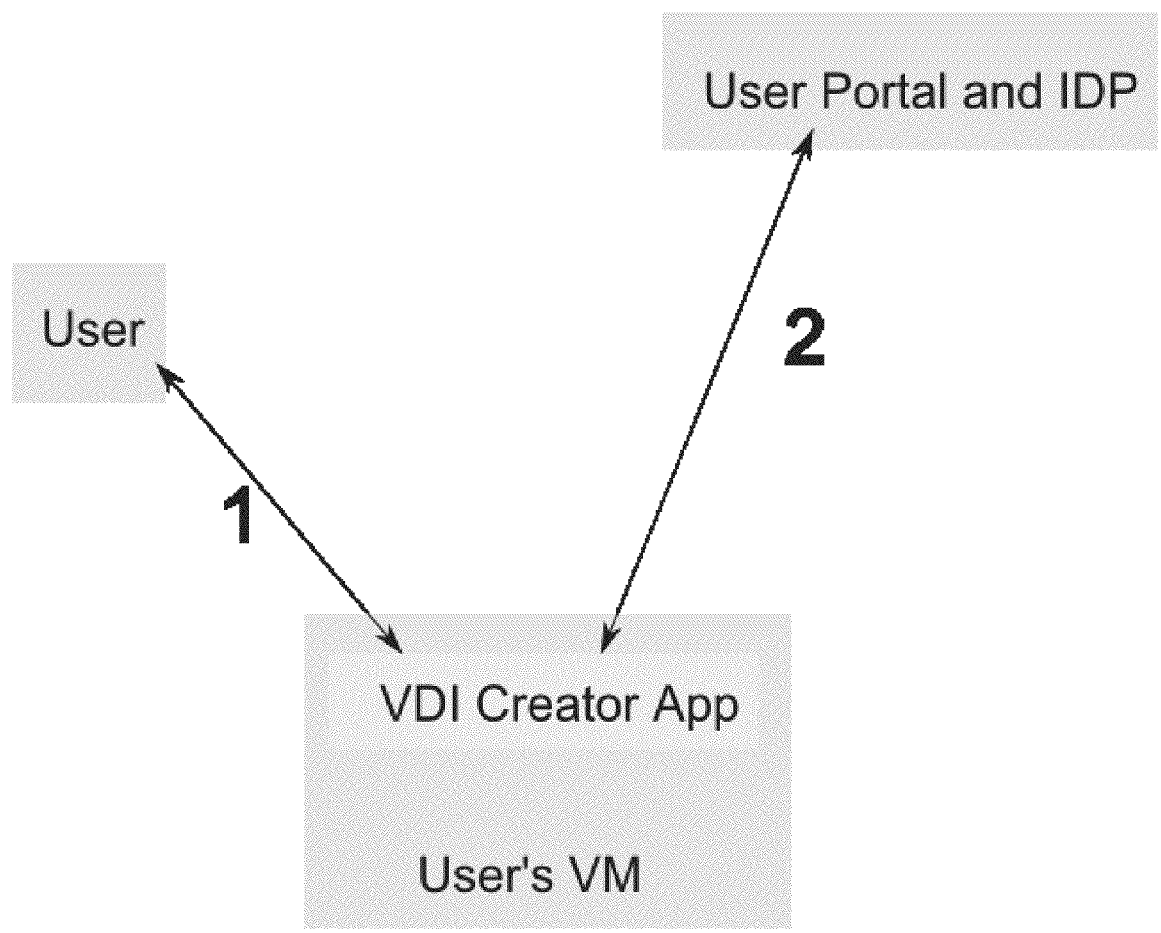
FIG. 6 is a diagram of example creation of the VM artifact depicted in the FIG. 5, according to an embodiment.

FIG. 6 is a diagram of example creation of the VM artifact depicted in the FIG. 5, according to an embodiment.

VDI artifact is created at IDP as all the information is available there except:
    the VM on which the resource resides; and
    the resource details.

At 1, the User launches the VDI creator App and inputs the following:
    The resource path;
    The access type (http, ftp, scp, nfs etc.);
    Bearer token type or holder of the key type; and
    Intended users of the resource (the app can query user portal for a list of users or user can manually enter the user names).

At 2, a request is made to the IDP to create a VDI artifact. The request contains the information of the VM's unique identity on which the resource is located and is added to the above data. The IDP analyzes the request and creates the content of the artifact which includes the following:
    Creation of SAML token containing authentication and authorization policies;
    Encryption of the receiver's data by using IDP's public key;
    Encryption of the resource data using IDP's public key; and Generation of owner payload, indicating who the owner is The IDP puts all the payloads together as the required artifact and sends it back to the VDI creator App for signing. The VDI creator App signs it with the private key of the user and sends it back to IDP.

After receiving the signed artifact, the IDP pushes it to the user's portal for user to download it and share it.

Artifact Verification:

When an artifact has arrived, the IDP verifies the artifact content by validating the signature embedded it in by using the public key of the owner or by using its own public key depending on how the artifact owner data is generated. Anyone who holds the public key of the owner or IDP can verify that this artifact belongs to the owner; however, the content of the artifact can only be decrypted by the IDP as it is encrypted by using its public key.

The mechanisms and techniques presented herein provide for a variety of benefits, such as but not limited to:

1. any resource in a VDI can be represented as a VDI artifact, which can be uniquely identified (note that the IP address of the VM is known only at the runtime, it has to be dereferenced);
2. the process of verification of the ownership of the artifact (the VDI artifact would have been signed by the owner of the artifact, or the IDP, when the artifact is presented, it is verified first);
3. the process of enforcing the authorization; the authZ token will contain who can access it; if it is a named token, it will contain the public key of the target user;
4. the process of artifact generation and verification;
5. real time dereferencing of the artifact to real resource and dynamic generation of authentication and authorization policies for the consumption by VDI access point; and
6. dynamic generation of Pseudo resource, to which the user is redirected and against which the authorization policies are enforced.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
receiving, by a hardware processor, access details from an identity service for a resource that is to be shared externally from a virtual machine (VM), the virtual machine is a logical processing environment superimposed on a physical computing device and
wherein receiving further includes initially configuring the method as a VM access layer that is interposed between instantiations of the VM as VMs, and the VM access layer processes transactions directed to and from the VMs to enforce access restrictions;
creating, by the hardware processor, a dynamic resource reference for the resource and a policy for managing and controlling access to the resource;
sending, by the hardware processor, the dynamic resource reference and the policy back to the identity service that delivers the dynamic resource to a requesting principal located external to the VM; and
enforcing the access restrictions against the transactions directed to and from the VMs.

2. The method of claim 1, wherein creating further includes digitally signing the dynamic resource reference and the policy for subsequent verification by the identity service.

3. The method of claim 1, wherein creating further includes creating the dynamic resource reference that identifies a local location for the resource within the VM that is dynamically resolved to a particular location for the resource when the requesting principal requests shared access to the resource from the VM.

4. The method of claim 1, wherein creating further includes assembling the dynamic resource reference as a pseudo access point represented in a uniform resource locator (URL) link or uniform resource identifier (URI) link.

5. The method of claim 4, wherein assembling further includes generating the URL or URI link as a relative location within the VM and that is dependent on the particular location of the VM, the particular location resolved at runtime when the requesting principal subsequently asks for the resource.

6. The method of claim 1, wherein creating further includes providing the dynamic resource reference to be resolved in real-time when a request is made for the resource by the requesting principal.

7. The method of claim 1, wherein creating further includes creating the dynamic resource reference as an artifact.

8. The method of claim 7, wherein creating further includes digitally signing the artifact with a private key of an owner.

9. The method of claim 8, wherein creating further includes providing with the signed artifact encrypted data relevant to the requesting principal, the encrypted data encrypted with a public key of the identity service.

10. A method, comprising:
creating, by a hardware processor, a reference for a principal to access a resource externally from a Virtual Machine (VM), the reference created within the VM by the VM and the VM is a logical processing environment that is superimposed on a physical computing device and
wherein creating further includes providing the reference as a logical reference to a physical location within the VM for accessing the resource;
providing the reference to an identity service to deliver to a principal; and
enforcing access restrictions against accesses made by the principal to the resource.

11. The method of claim 10, wherein creating further includes providing with the reference authentication details for the requesting principal to use the reference.

12. The method of claim 10, wherein creating further includes providing the reference to be dynamically resolved when used by the principal to access the resource.

13. The method of claim 10, wherein creating further includes providing with the reference an identity for the principal for the identity service to use for delivery to the principal.

14. The method of claim 10, wherein creating further includes providing with the reference a policy to control and manage access to the resource when the reference is used by the principal.

15. A system, comprising:
a hardware processor; and
a Virtual Machine (VM) configured that:
  i) executes on the hardware processor,
  ii) creates a reference to a resource within the VM customized for a principal that accesses the resource externally from the VM,
  iii) delivers the reference to an identity service to authenticate the principal and provide the reference to the principal, wherein the VM is a logical processing environment that is superimposed on a physical computing device and
  iv) enforce access restrictions against the principal when accesses are made to the resource by the principal,
  wherein the VM is further, in ii), to: provides with the reference an identity for the principal and an authentication mechanism for the identity service to use when authenticating the principal for using the reference.

* * * * *